(12) United States Patent
Yuan et al.

(10) Patent No.: US 11,230,858 B2
(45) Date of Patent: Jan. 25, 2022

(54) FOLDABLE TENT

(71) Applicant: WEIZI E-COMMERCE (SHANGHAI) CO., LTD, Shanghai (CN)

(72) Inventors: Chunliang Yuan, Shanghai (CN); Shengyong Yang, Shanghai (CN)

( * ) Notice: Subject to any disclaimer, the term of this patent is extended or adjusted under 35 U.S.C. 154(b) by 0 days.

(21) Appl. No.: 16/334,994

(22) PCT Filed: Sep. 6, 2017

(86) PCT No.: PCT/CN2017/100773
§ 371 (c)(1),
(2) Date: Mar. 20, 2019

(87) PCT Pub. No.: WO2019/028960
PCT Pub. Date: Feb. 14, 2019

(65) Prior Publication Data
US 2020/0157838 A1 May 21, 2020

(30) Foreign Application Priority Data
Aug. 10, 2017 (CN) .......................... 201710679291.5

(51) Int. Cl.
*E04H 15/50* (2006.01)
(52) U.S. Cl.
CPC .................................... *E04H 15/50* (2013.01)
(58) Field of Classification Search
CPC ...................................................... E04H 15/50
See application file for complete search history.

(56) References Cited

U.S. PATENT DOCUMENTS

| 6,848,461 B2* | 2/2005 | Tsai | E04H 15/50 135/131 |
| 6,868,858 B2* | 3/2005 | Suh | E04H 15/50 135/131 |
| 8,701,692 B2* | 4/2014 | Holland | E04H 15/46 135/145 |
| 8,776,815 B2* | 7/2014 | Park | E04H 15/50 135/145 |
| 10,113,329 B2* | 10/2018 | Choi | E04H 15/46 |
| 10,280,645 B1* | 5/2019 | Yang | E04H 15/18 |
| 10,309,121 B2* | 6/2019 | Choi | E04H 15/58 |
| 2011/0073148 A1* | 3/2011 | Choi | E04H 15/50 135/145 |
| 2016/0108639 A1* | 4/2016 | Huang | E04H 15/54 135/144 |
| 2018/0106068 A1* | 4/2018 | Choi | E04H 15/18 |

* cited by examiner

*Primary Examiner* — Noah Chandler Hawk
(74) *Attorney, Agent, or Firm* — John R. Ross; John R. Ross, III (57) ABSTRACT

The present disclosure provides a foldable tent, having column assemblies and top rod assemblies, and the top rod assemblies have first top rods, second top rods and overhanging rods, inner end portions of the first top rods are rotatably connected with each other, outer end portions of the first top rods and inner end portions of the second top rods are rotatably connected, and outer end portions of the second top rods, inner end portions of the overhanging rods and upper end portions of the column assemblies are rotatably connected via two axles or coaxially rotatably connected; each of the top rod assemblies further comprises transmission members connected between the first top rods and the overhanging rods for unfolding or folding the overhanging rods and the first top rods.

12 Claims, 10 Drawing Sheets

FOLDABLE TENT

TECHNICAL FIELD OF THE INVENTION

The present disclosure relates to a foldable tent.

BACKGROUND OF THE INVENTION

The tents are of various structural forms, and the tents used for outdoor sunshading are usually folding tents. The traditional folding tent has a small shade area, and in order to increase the shade area of the tent after opened, an eaves type tent with an eaves structure appears, and the top corner of the tent is provided with protruding overhanging rods, and a surrounding edge is provided on the overhanging rods to achieve the purpose of increasing the shading area. The overhanging rods are mainly pivoted to or inserted into the top rods of the support at the top of the tent, and the outer ends of the overhanging rods movably extend out of the respective columns. However, in the current folding tent, the overhanging rods are independently arranged with respect to the tent main body support, and it is required to operate in two steps when unfolding or folding. That is to say, when unfolding, the tent main body support is first unfolded, and then the overhanging rods are opened or pulled one by one, and due to the overhanging rods are in a higher position, it is inconvenient to achieve the operation, and the folding is reversed, and the same problem exists. Therefore, the existing folding tent has problems such as a complicated structure, and cumbersome and inconvenient to fold and unfold.

SUMMARY OF THE INVENTION

To solve the above-mentioned technical problems, the present disclosure provides a foldable tent, which has a large sunshade area and of which the overhanging rod can be unfolded and folded together with the first top rods, which is convenient to operate; after unfolded, the transmission member has a reinforcing effect on the second top rods.

To achieve the above purpose, the technical solution employed by the present disclosure is as follows:

A foldable tent comprises at least three column assemblies, and top rod assemblies which are of the same number of and one-to-one corresponding to the column assemblies, wherein upper end portions of each two adjacent column assemblies are connected via a side rod assembly, and each top rod assembly comprises a first top rod, a second top rod and an overhanging rod, which are sequentially arranged from inside to outside and respectively have an inner end portion and an outer end portion; the inner end portions of the first top rods of the respective top rod assemblies are rotatably connected with each other; in each of the top rod assemblies, the outer end portion of the first top rod and the inner end portion of the second top rod are rotatably connected, and the outer end portion of the second top rod, the inner end portion of the overhanging rod and an upper end portion of a corresponding column assembly are rotatably connected via two axles or coaxially rotatably connected; the tent has an unfolded state and a folded state, when the tent is in the unfolded state, the first top rod, the second top rod and the overhanging rod of each top rod assembly are respectively unfolded with respect to each other and the outer end portion of the overhanging rod extends to an outer side of the corresponding column assembly; when the tent is in the folded state, the first top rod, the second top rod and the overhanging rod of each top rod assembly are respectively drawn close to each other; each of the top rod assemblies further comprises a transmission member connected between the first top rod and the overhanging rod for unfolding or folding the overhanging rod and the first top rod.

Preferably, the transmission member is a transmission rod rotatably connected between the first top rod and the overhanging rod, and the first top rod, the second top rod, the overhanging rod and the transmission rod form a four-bar linkage mechanism.

More preferably, the transmission rod has an inner end portion rotatably connected with the first top rod and an outer end portion rotatably connected with the overhanging rod, and a joint of the transmission rod and the first top rod is on the outside of a joint of the second top rod and the first top rod, and a joint of the transmission rod and the overhanging top rod is on the outside of a joint of the second top rod and the overhanging top rod.

More preferably, when the tent is in the unfolded state, centerlines of the second top rod and the transmission rod of each of the top rod assemblies are parallel or form an angle less than 10°.

Further, when the tent is in the unfolded state, centerlines of the first top rod, the second top rod, the transmission rod and the overhanging rod of each of the top rod assemblies are parallel.

Preferably, in each top rod assembly, the first top rod and the second top rod are rotatably connected via a pivot, and the transmission rod is rotatably connected with the first top rod and the overhanging rod via pivots, respectively, the outer end portion of the second top rod and the overhanging rod are rotatably connected to the upper end portion of the column assembly via pivots, respectively, and axes of the respective pivots of the same top rod assembly respectively extend along horizontal directions and are parallel to each other.

Preferably, each column assembly comprises a sliding block slidable along an up-down direction, each top rod assembly comprises a drive rod having an upper end portion and a lower end portion, the upper end portion of the drive rod is rotatably connected to the second top rod or the sliding block, and the lower end portion of the drive rod is rotatably connected to the corresponding sliding block to drive the second top rod or the transmission member to action along with moving of the sliding block.

More preferably, each of the column assemblies comprises a column upper segment and a column lower segment slidably inserted in the column upper segment along the up-down direction, and the sliding block is slidably arranged on the column upper segment along the up-down direction.

More preferably, each of the side rod assemblies comprises a cross-shaped support rod, and each cross-shaped support rod comprises a first connecting rod and a second connecting rod which are rotatably connected in middle portions and respectively have upper ends and lower ends, the upper end and the lower end of the first connecting rod are respectively rotatably connected with an upper end portion of one column assembly and the sliding block on another column assembly, and the upper end and the lower end of the second connecting rod are respectively rotatably connected with the sliding block on the one column assembly and an upper end portion of the another column assembly; or, each of the side rod assemblies comprises a plurality of cross-shaped support rods rotatably connected successively, and each of the cross-shaped support rods comprises a first connecting rod and a second connecting rod which are rotatably connected in middle portions and respectively have upper ends and lower ends, the upper end of the first connecting rod is rotatably connected with an upper end portion of one column assembly or the upper end of the second connecting rod of another cross-shaped support rod, the lower end of the first connecting rod is rotatably connected with the lower end of the second connecting rod of another cross-shaped support rod or the sliding block on another column assembly, the lower end of the second connecting rod is rotatably connected with the sliding block on the one column assembly or the lower end of the first connecting rod of another cross-shaped support rod, and the upper end of the second connecting rod is rotatably connected with the upper end of the first connecting rod of another cross-shaped support rod or an upper end portion of the another column assembly.

Preferably, each of the top rod assemblies comprises a support rod, and the support rod is rotatably disposed between the inner end portion and the outer end portion of the first top rod, the support rods of the respective top rod assemblies are rotatably connected, and a joint of the respective support rods are located below a joint of the inner end portions of the respective first top rods.

Due to the use of the above technical solutions, the present disclosure has the following advantages over the prior art:

During the unfolding process, the overhanging rods can be unfolded together with the first top rods under the action of the transmission members, and the overhanging rods do not need to be unfolded separately, which is convenient to unfold; during the folding process, the overhanging rods can be folded together with the first top rods under the action of the transmission members, and the overhanging rods do not need to be folded separately, which is convenient to fold. In addition, after unfolding, the transmission members have a reinforcing effect on the second top rods, making the top rod assemblies more stable; the overhanging rods increase the sunshade area of the tent.

BRIEF DESCRIPTION OF THE DRAWINGS

For explaining the technical solutions of the present disclosure more clearly, the accompanying drawings used to describe the embodiments are simply introduced in the following. Apparently, the below described drawings merely show some embodiments of the present disclosure, and those skilled in the art can obtain other drawings according to the accompanying drawings without creative work.

FIG. 14 is a schematic view of the tent in the folded stated shown in FIG. 1;
Wherein:

1—column assembly; 11—column upper segment; 12—column lower segment;
2—top rod assembly; 21—first top rod; 22—second top rod; 221—clamping portion; 23—overhanging rod; 24—transmission rod; 241—clamping portion; 25—support rod;
3—side rod assembly; 30—cross-shaped support rod; 31—first connecting rod; 32—second connecting rod;
41—upper central connection; 42—lower central connection;
51—sliding block; 52—drive rod.

DETAILED DESCRIPTION OF EXEMPLARY EMBODIMENTS

In the following, the preferable embodiments of the present disclosure are explained in detail combining with the accompanying drawings so that the advantages and features of the present disclosure can be easily understood by the skilled persons in the art. It is should be noted that the explanation on these implementations is to help understanding of the present disclosure, and is not intended to limit the present disclosure. Further, the technical features involved in the various embodiments of the present disclosure described below may be combined with each other as long as they do not conflict with each other.

The present embodiment provides a foldable tent with eaves, which has a relatively large sunshade area. As shown in FIGS. 1-14, a foldable tent comprises at least three column assemblies 1, and top rod assemblies 2 which are of the same number of and one-to-one corresponding to the column assemblies 1, and upper end portions of any two adjacent column assemblies 1 are respectively connected via a side rod assembly 3. Specifically, in the present embodiment, there are four column assemblies, which are arranged at equal intervals to embrace a cube space, and the column assemblies 1 substantially extend along an vertical direction to support the tent on the ground. There are correspondingly four top rod assemblies 2, to form a top frame of the tent. There are correspondingly four side rod assemblies 3, which are located at front, back, left and right sides of the tent, respectively.

Figure 2:
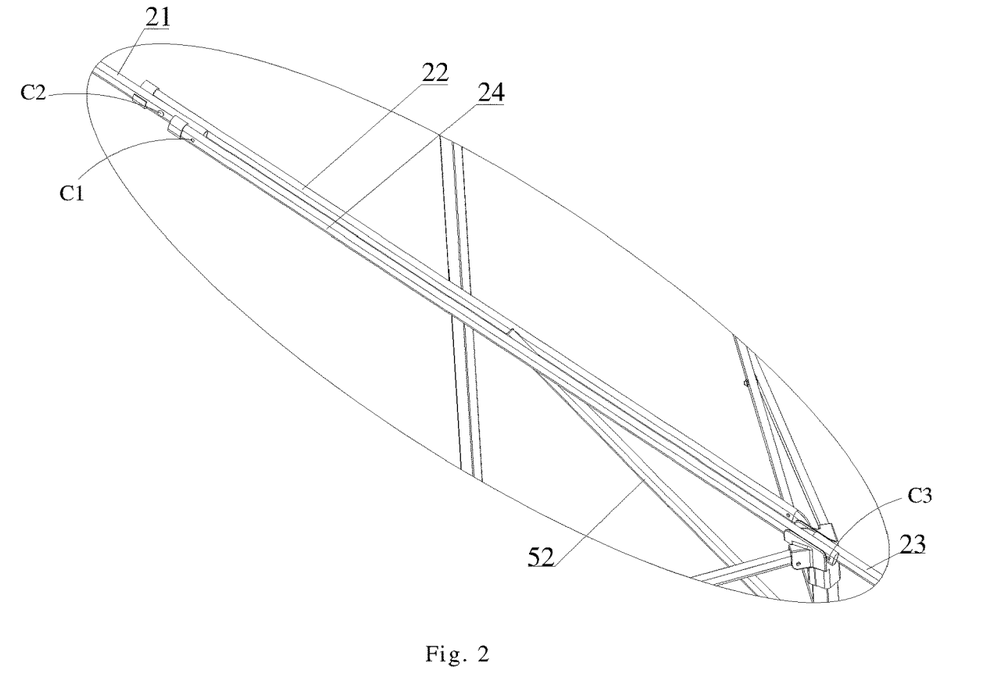
FIG. 2 is a partial enlarged view of Part I in FIG. 1.
Figure 3:
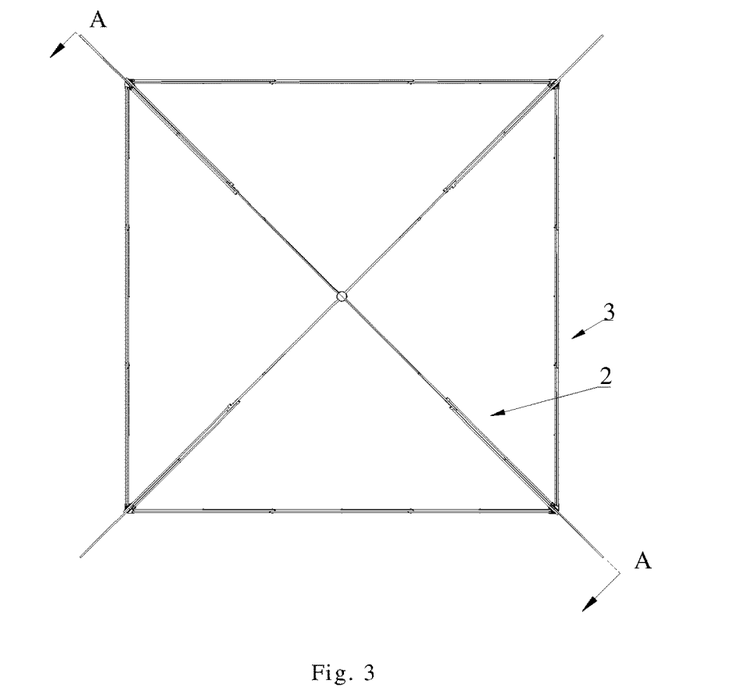
FIG. 3 is a top view of the tent shown in FIG. 1.
Figure 4:
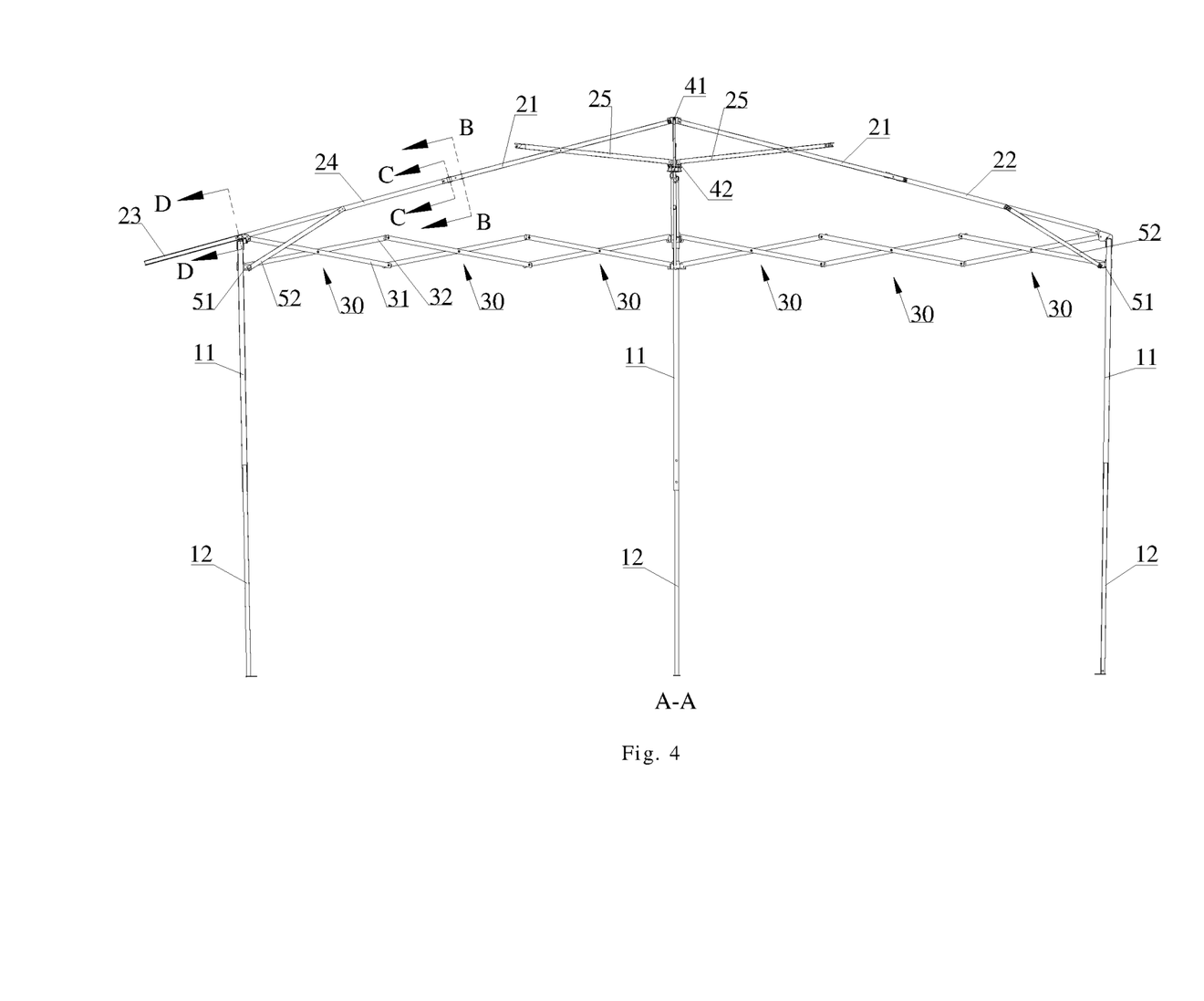
FIG. 4 is a sectional view along Line A-A of FIG. 3.

As shown in FIG. 2, each of the top rod assemblies comprises a first top rod 21, a second top rod 22 and an overhanging rod 23, which are sequentially arranged from inside to outside and respectively have an inner end portion and an outer end portion. The nouns of locality such as "inner" and "outer" defined herein are all referenced to the vertical centerline of the tent, and inner means closer to the vertical centerline of the tent, and outer is on the contrary. The inner end portions of the four first top rods 21 of the four top rod assemblies 2 are rotatably connected to an upper central connection 41 via pivots, such that the four top rod assemblies 2 form a cross structure extending along diagonal lines of the tent top frame to four vertex angles of the tent, and may rotate with respect to each other. In each of the top rod assemblies 2, the outer end portion of the first top rod 21 and the inner end portion of the second top rod 22 are rotatably connected via a pivot, and the outer end portion of the second top rod 22, the inner end portion of the overhanging rod 23 and an upper end portion of a corresponding column assembly 1 are pair-wise rotatably connected. In other words, the outer end portion of the second top rod 22, the inner end portion of the overhanging rod 23 and the upper end portion of the corresponding column assembly 1 may be pair-wise connected via two pivots or rotatably connected via one same pivot, for example, the outer end portion of the second top rod 22 and the inner end portion of the overhanging rod 23 are rotatably connected via a pivot, and the upper end portion of the corresponding column assembly 1 may be rotatably connected via another pivot with one of the outer end portion of the second top rod 22 and the inner end portion of the overhanging rod 23. Specifically in the present embodiment, the outer end portion of the first top rod 22 and the inner end portion of the second top rod 23 are rotatably connected to the upper end portion of the corresponding column assembly 1 via the same pivot.

Each of the top rod assemblies 2 further comprises a transmission member connected between the first top rod 21 and the overhanging rod 23 for unfolding or folding the overhanging rod 23 together with the first top rod 21. Typically, the transmission member may be a transmission rod 24 rotatably connected between the first top rod 21 and the overhanging rod 23, and the first top rod, the second top rod, the overhanging rod and the transmission rod form a four-bar linkage mechanism, and the four rods are linked to get folded or unfolded with respect to each other. The transmission rod 24 has an inner end portion rotatably connected with the outer end portion of the first top rod 21 via a pivot and an outer end portion rotatably connected with the inner end portion of the overhanging rod 23 via a pivot, wherein, a joint C1 of the transmission rod 24 and the first top rod 21 is on the outside of a joint C2 of the second top rod 22 and the first top rod 21, and a joint C3 of the transmission rod 24 and the overhanging top rod 23 is on the outside of a joint C4 of the second top rod 22 and the overhanging top rod 23, as shown in FIG. 2.

Each of the top rod assemblies 2 further comprises a support rod 25, which is rotatably arranged between the inner end portion and the outer end portion of the first top rod 21 via a pivot. The inner end portions of the support rods 25 of the four top rod assemblies 2 are all rotatably connected to a lower central connection 42 via a pivot, and the lower central connection 42 is located right below the upper central connection 41 and both geometric centers of the two are in the vertical centerline of the tent. It should be noted that, axes of the respective pivots on the same top rod assembly 2 respectively extend along the horizontal direction and are parallel to each other.

Figure 5:
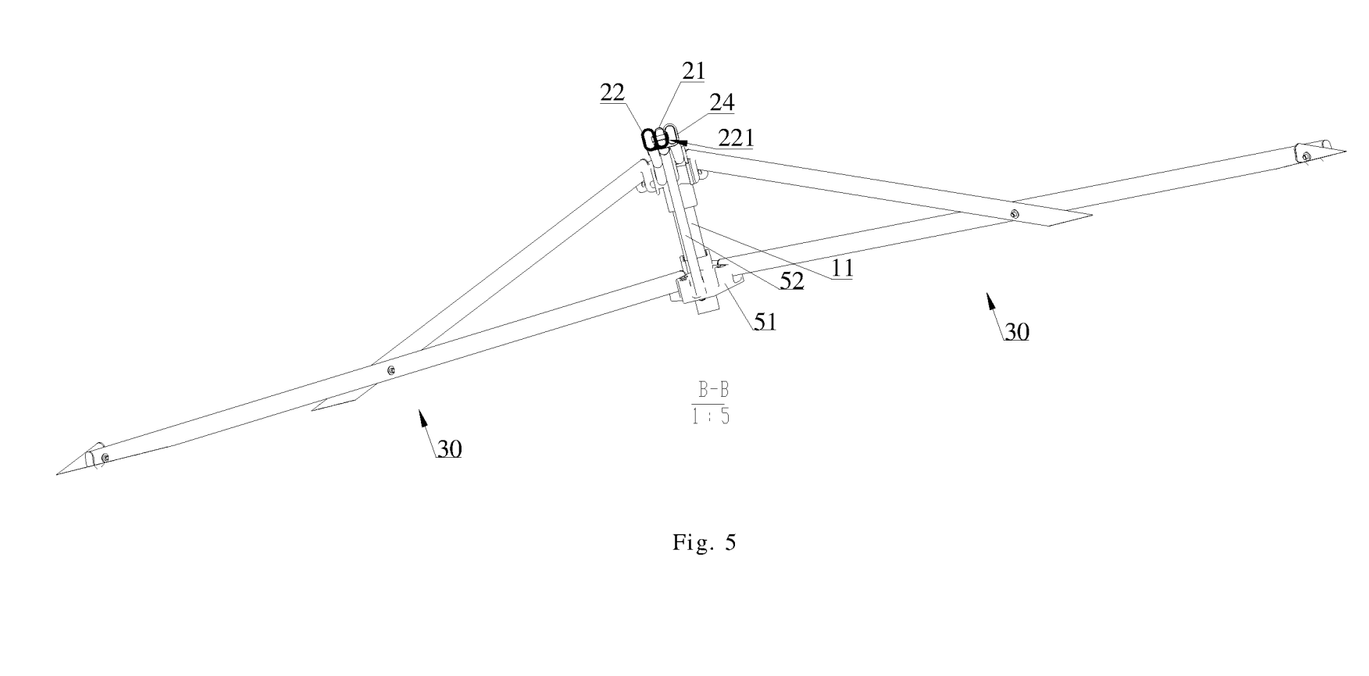
FIG. 5 is a sectional view along Line B-B of FIG. 3.
Figure 6:
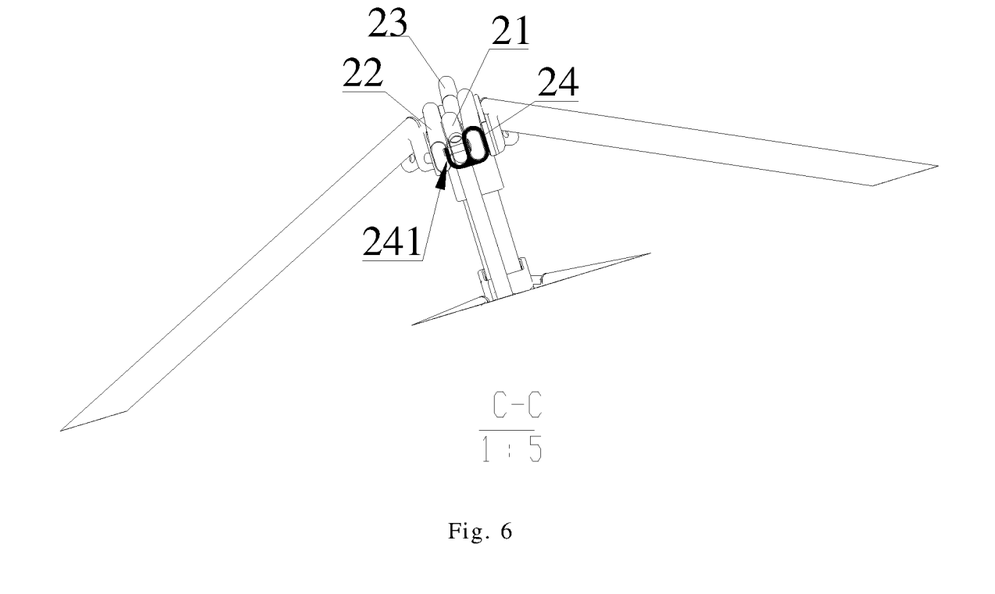
FIG. 6 is a sectional view along Line C-C of FIG. 3.
Figure 7:
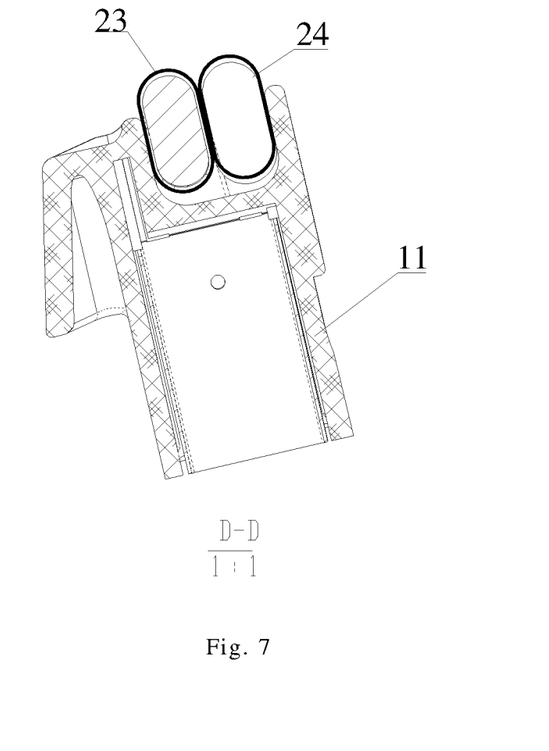
FIG. 7 is a sectional view along Line D-D of FIG. 3.
Figure 8:
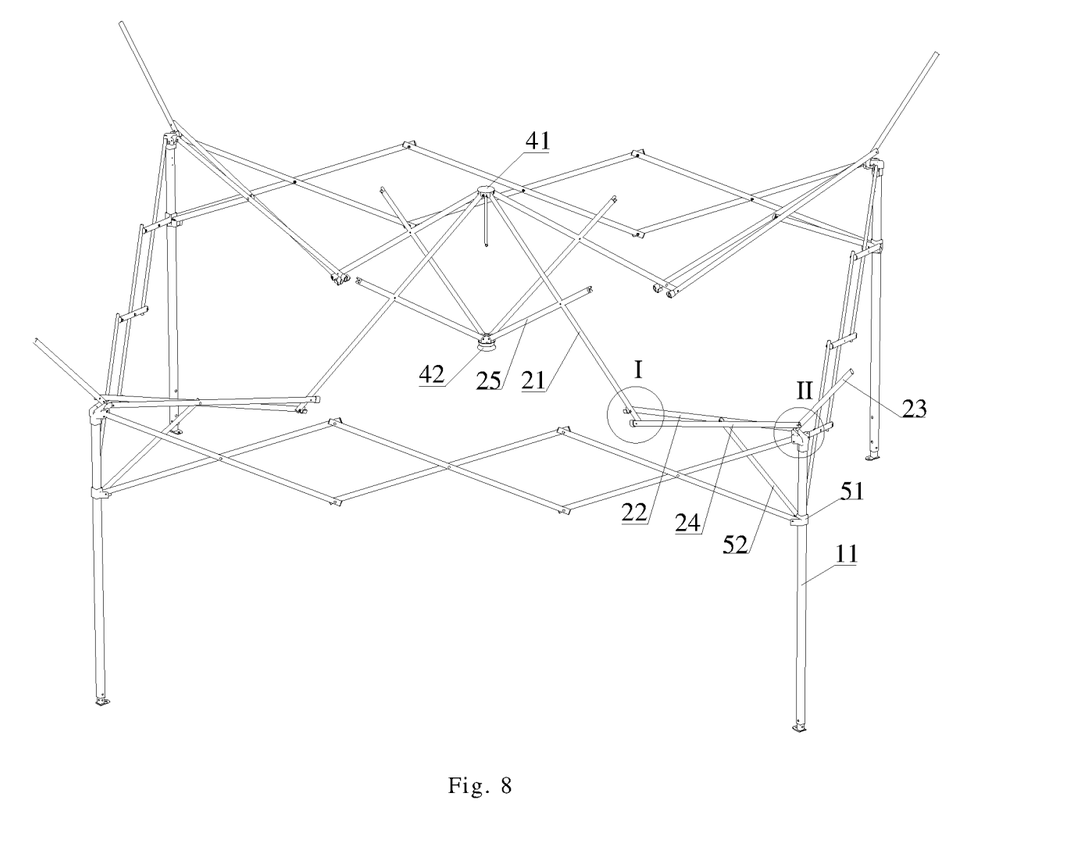
FIG. 8 is a schematic view of the tent during folding shown in FIG. 1.
Figure 9:
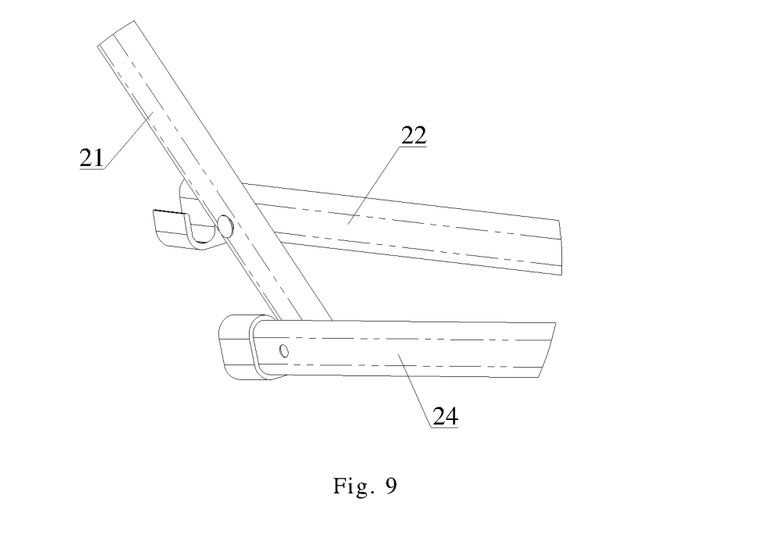
FIG. 9 is a partial enlarged view of Part I in FIG. 8.
Figure 10:
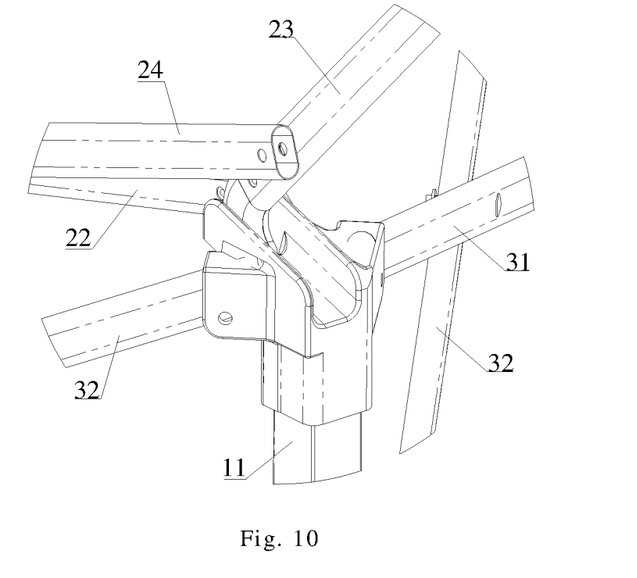
FIG. 10 is a partial enlarged view of Part II in FIG. 8.
Figure 11:
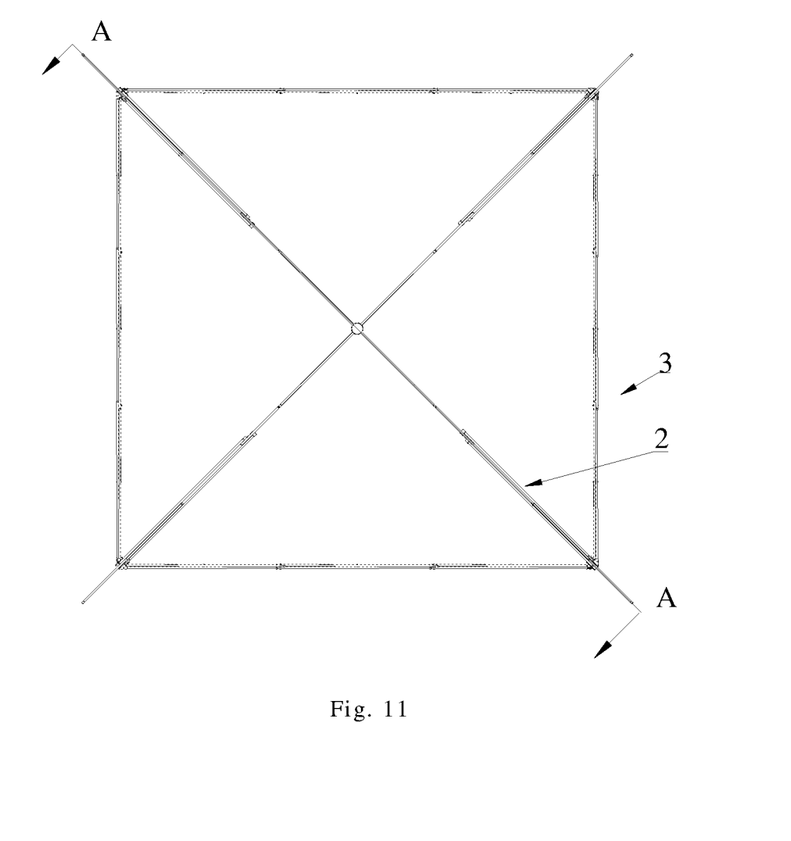
FIG. 11 is a top view of the tent shown in FIG. 8.
Figure 12:
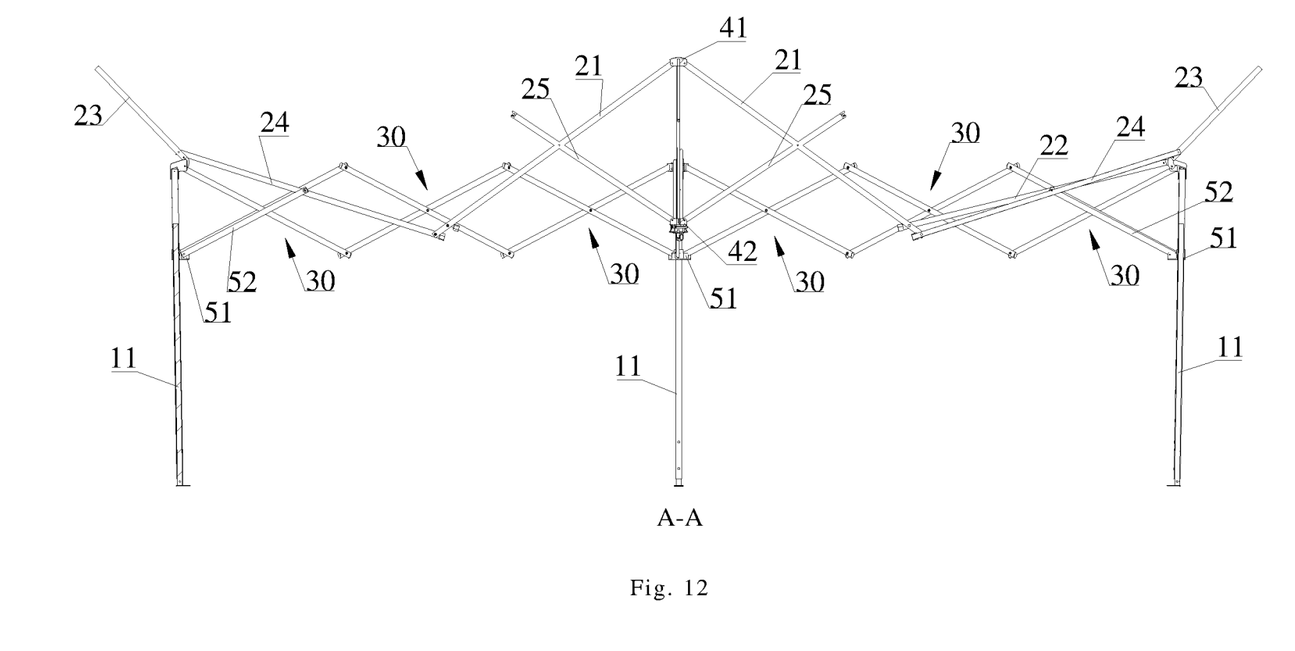
FIG. 12 is a sectional view along Line A-A of FIG. 11.
Figure 13:
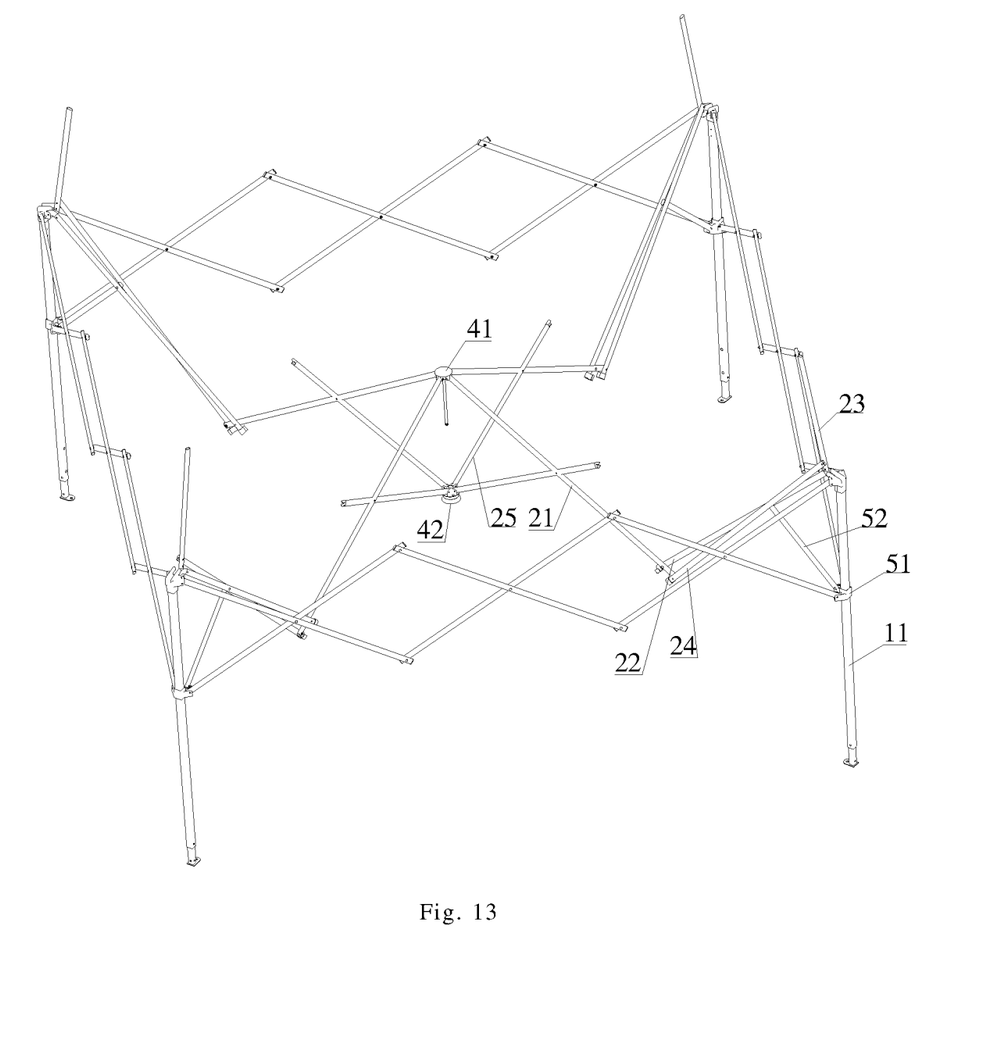
FIG. 13 is a schematic view of the tent after further folding shown in FIG. 8.

The tent has an unfolded state and a folded state, when the tent is in the unfolded state, the first top rod 21, the second top rod 22 and the overhanging rod 23 of each top rod assembly 2 are respectively unfolded with respect to each other and the outer end portion of the overhanging rod 23 extends to an outer side of the corresponding column assembly 1; when the tent is in the folded state, the first top rod 21, the second top rod 22 and the overhanging rod 23 of each top rod assembly 2 are respectively drawn close to each other. It should be noted that, when the tent is in the unfolded state, centerlines of the second top rod 22 and the transmission rod 24 of each of the top rod assemblies 2 are parallel or form an angle less than 10°. More preferably, when the tent is in the unfolded state, centerlines of the first top rod 21, the second top rod 22, the transmission rod 24 and the overhanging rod 23 of each top rod assembly 2 are parallel, such that the transmission rod 24 have a well reinforcing effect on the second top rod 22, improving the strength of the top frame of the tent. More specifically, as shown in FIGS. 2 and 5-7, in each of the top rod assemblies 2, the centerlines of the first top rod 21 and the overhanging rod 23 are coaxial, and the second top rod 22 and the transmission rod 24 are located at two sides of the centerlines of the first top rod 21 and the overhanging rod 23, respectively, such that the connection is relative secure and more stable. In addition, as shown in FIG. 5, besides connected via pivots, the second top rod 22 is further fixedly provided with or integrally formed a U-shaped clamping portion 221, the clamping portion 221 has a clamping slot cooperating with the first top rod 21 in which the fist top rod 21 may be clamped, such that the tent in the unfolded state is more stable; and the clamping slot has an upward slot opening, and the first top rod 21 may be detached from the clamping slot when turning, without interfering the folding of the tent. The first top rod 21 and the transmission rod 24 also employ a similar connection manner, as shown in FIG. 6, the transmission rod 24 is also fixedly provided with or integrally formed a U-shaped clamping portion 241, the clamping portion 241 has a clamping slot cooperating with the first top rod 21, and the first top rod 21 may be detachably clamped in the clamping slot.

Each of the column assemblies 1 comprises a column upper segment 11 and a column lower segment 12 slidably inserted in the column upper segment 11 along the up-down direction. The second top rod 22 and the overhanging rod 23 of the top rod assembly 2 are respectively rotatably arranged on an upper end portion of the column upper segment 11. The column upper segment 11 of each column assembly 1 is sleeved with a sliding block 51 slidable along an up-down direction. Each top rod assembly 2 further comprises a drive rod 52 having an upper end portion and a lower end portion, the upper end portion of the drive rod 52 is rotatably connected between the inner end portion and the outer end portion of the transmission rod 24, and the lower end portion of the drive rod 52 is rotatably connected to the corresponding sliding block 51 to drive the transmission rod 24 to action along with moving of the sliding block 51.

The side rod assemblies 3 are formed by one or more cross-shaped support rods 30 rotatably connected successively, and each cross-shaped support rod 30 comprises a first connecting rod 31 and a second connecting rod 32 which are rotatably connected respectively have upper ends and lower ends, the middle portion of the first connecting rod 31 and the middle portion of the second connecting rod 32 are rotatably connected via a pivot to intersect and form a cross-shaped structure. Specifically in the present embodiment, each side rod assembly 3 are formed by three cross-shaped support rods 30, wherein the upper end portion of the first connection rod 31 is rotatably connected with an upper end portion of one column assembly 1 or the upper end of the second connecting rod 32 of another cross-shaped support rod 30, the lower end of the first connecting rod 31 is rotatably connected with the lower end of the second connecting rod 32 of another cross-shaped support rod 30 or the sliding block 51 on another column assembly 1, the lower end of the second connecting rod 32 is rotatably connected with the sliding block 51 on the one column assembly 1 or the lower end of the first connecting rod 31 of another cross-shaped support rod 30, and the upper end of the second connecting rod 32 is rotatably connected with the upper end of the first connecting rod 31 of another cross-shaped support rod 30 or an upper end portion of the another column assembly 1.

When folding the above mentioned tent, a lock mechanism disposed on the upper central connection 41 and/or between the respective first top rods 21 is first unlocked, and this lock mechanism may employ a known locking manner in the prior art, no more details; the column lower segments 12 of the column assemblies 1 are received within the column upper segments 11; the sliding blocks 51 on the column assemblies 1 are pulled down to drive the drive rods

Figure 1:
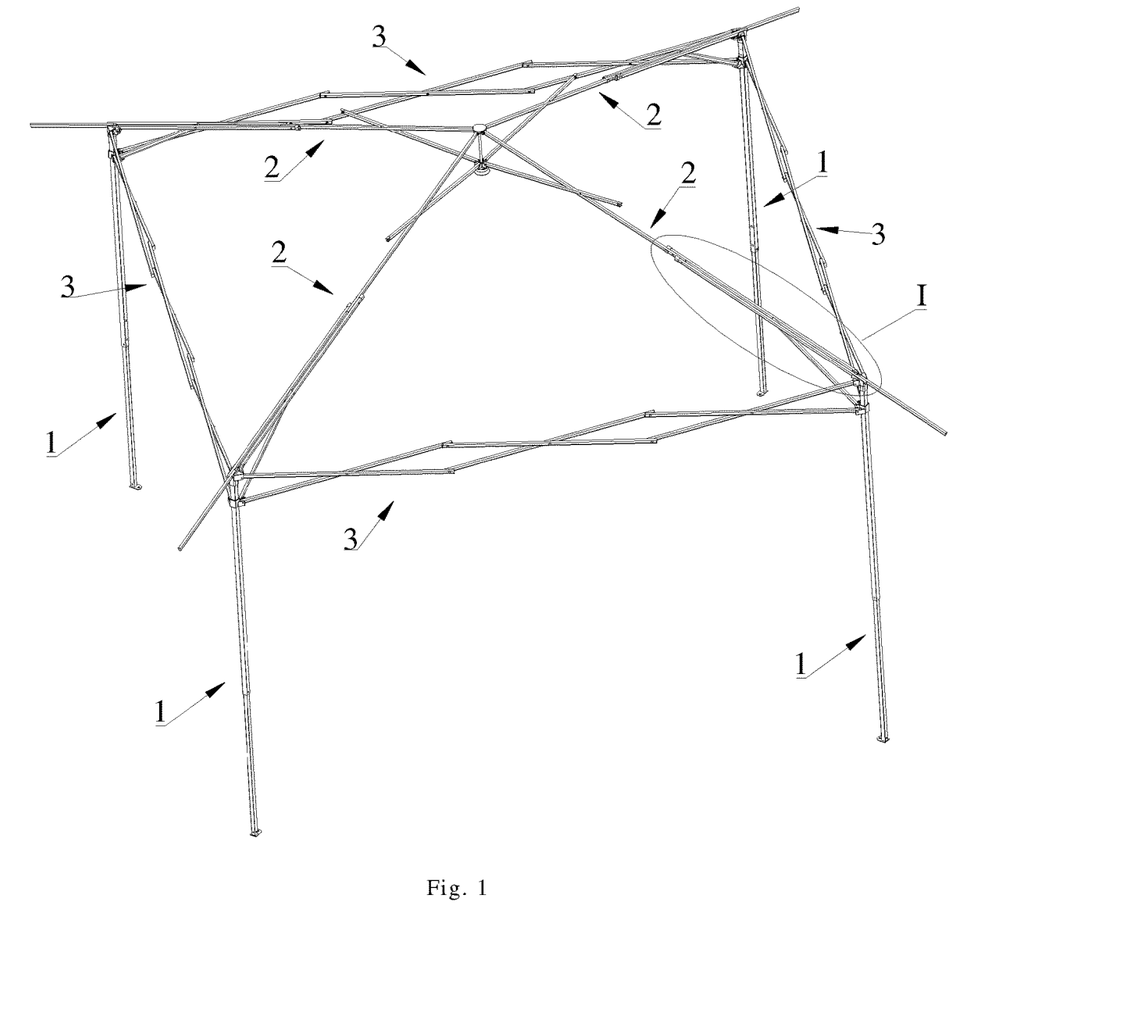
FIG. 1 is a schematic diagram of a tent in an unfolded state according to the present disclosure.
Figure 14:
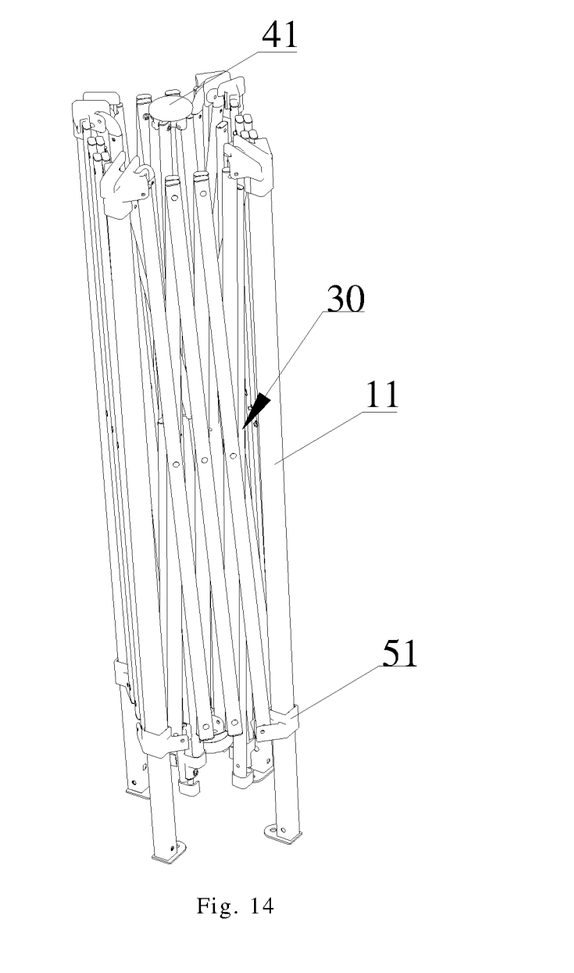

52 to rotate, along with which the transmission rods 24 rotate, and under the action of the transmission rods 24, the first top rods 21 and the second top rods 22 get close to each other, and the outer end portions of the overhanging rods 23 rotate upwardly and inwardly; meanwhile, along with drawing back the top rod assemblies 2, the column assemblies 1 get close to each other, such that the respective cross-shaped support rods 30 of the side rod assemblies 3 get close to each other; when the sliding blocks 51 move to its lowest position, the respective column assemblies 1 get close to each other, the respective cross-shaped support rods get close to each other, and the respective top rod assemblies is drawn back between the column assemblies 1, to achieve the folded state as shown in FIG. 14. It can be seen that, the tent in the folded state has a compact overall structure, and a small folded size; and during the folding process, all the respective rods (including the overhanging rods 23) may get folded under the action of the sliding block 51, there is no need to fold the overhanging rods 23 separately, and the folding operation is convenient. Conversely, when unfolding the above mentioned tent, the sliding blocks 51 are slid upwardly, and by the interaction between the drive rods 52 and the transmission rods 24, the first top rods 21 and the overhanging rods 23 of the respective top rod assemblies 2 are unfolded with respect to the second top rods 22; the column assemblies 1 and the side rod assemblies 3 are opened toward around along with the top rod assemblies 2; and after the tent is unfolded, the lock mechanism disposed on the upper central connection 41 and/or between the respective first top rods 21 is locked to stabilize the tent in the unfolded state as shown in FIG. 1. During the unfolding process, all the respective rods (including the overhanging rods 23) may get unfolded under the action of the sliding block 51, there is no need to fold the overhanging rods 23 separately, and the folding operation is convenient; in addition, after unfolding, the transmission rods 24 have a reinforcing effect on the second top rods 22, making the top rod assemblies 2 more stable.

The embodiments described above are only for illustrating the technical concepts and features of the present disclosure, are preferred embodiments, and are intended to make those skilled in the art being able to understand the present disclosure and thereby implement it, and should not be concluded to limit the protective scope of this disclosure. Any equivalent variations or modifications according to the principles of the present disclosure should be covered by the protective scope of the present disclosure.

What is claimed is:

1. A foldable tent, comprising at least three column assemblies, and top rod assemblies which are of the same number of and one-to-one corresponding to the column assemblies, wherein upper end portions of each two adjacent column assemblies are connected via a side rod assembly, each top rod assembly comprises a first top rod, a second top rod and an overhanging rod, which are sequentially arranged from inside to outside and respectively have an inner end portion and an outer end portion; the inner end portions of the first top rods of the respective top rod assemblies are rotatably connected with each other; in each of the top rod assemblies, the outer end portion of the first top rod and the inner end portion of the second top rod are rotatably connected, the outer end portion of the second top rod and an upper end portion of a corresponding column assembly are rotatably connected, and the inner end portion of the overhanging rod and the upper end portion of a corresponding column assembly are rotatably connected; the tent has an unfolded state and a folded state, when the tent is in the unfolded state, the first top rod, the second top rod and the overhanging rod of each top rod assembly are respectively unfolded with respect to each other and the outer end portion of the overhanging rod extends to an outer side of the corresponding column assembly; when the tent is in the folded state, the first top rod, the second top rod and the overhanging rod of each top rod assembly are respectively drawn close to each other; each of the top rod assemblies further comprises a transmission member connected between the outer end portion of the first top rod and the inner end portion of the overhanging rod for unfolding or folding the overhanging rod and the first top rod.

2. The foldable tent according to claim 1, wherein the transmission member is a transmission rod rotatably connected between the first top rod and the overhanging rod, and the first top rod, the second top rod, the overhanging rod and the transmission rod form a four-bar linkage mechanism.

3. The foldable tent according to claim 2, wherein the transmission rod has an inner end portion rotatably connected with the first top rod and an outer end portion rotatably connected with the overhanging rod, and a joint of the transmission rod and the first top rod is on the outside of a joint of the second top rod and the first top rod, and a joint of the transmission rod and the overhanging top rod is on the outside of a joint of the second top rod and the overhanging top rod.

4. The foldable tent according to claim 2, wherein when the tent is in the unfolded state, centerlines of the second top rod and the transmission rod of each of the top rod assemblies are parallel or form an angle less than 10°.

5. The foldable tent according to claim 4, wherein when the tent is in the unfolded state, centerlines of the first top rod, the second top rod, the transmission rod and the overhanging rod of each of the top rod assemblies are parallel.

6. The foldable tent according to claim 1, wherein in each top rod assembly, the first top rod and the second top rod are rotatably connected via a pivot, and the transmission rod is rotatably connected with the first top rod and the overhanging rod via pivots, respectively, the outer end portion of the second top rod and the overhanging rod are rotatably connected to the upper end portion of the column assembly via pivots, respectively, and axes of the respective pivots of the same top rod assembly respectively extend along horizontal directions and are parallel to each other.

7. The foldable tent according to claim 1, wherein each column assembly comprises a sliding block slidable along an up-down direction, each top rod assembly comprises a drive rod having an upper end portion and a lower end portion, the upper end portion of the drive rod is rotatably connected to the second top rod or the sliding block, and the lower end portion of the drive rod is rotatably connected to the corresponding sliding block to drive the second top rod or the transmission member to action along with moving of the sliding block.

8. The foldable tent according to claim 7, wherein each of the column assemblies comprises a column upper segment and a column lower segment slidably inserted in the column upper segment along the up-down direction, and the sliding block is slidably arranged on the column upper segment along the up-down direction.

9. The foldable tent according to claim 7, wherein each of the side rod assemblies comprises a cross-shaped support rod, and each cross-shaped support rod comprises a first connecting rod and a second connecting rod which are rotatably connected in middle portions and respectively have upper ends and lower ends, the upper end and the lower end of the first connecting rod are respectively rotatably connected with an upper end portion of one column assembly and the sliding block on another column assembly, and the upper end and the lower end of the second connecting rod are respectively rotatably connected with the sliding block on the one column assembly and an upper end portion of the another column assembly; or, each of the side rod assemblies comprises a plurality of cross-shaped support rods rotatably connected successively, and each of the cross-shaped support rods comprises a first connecting rod and a second connecting rod which are rotatably connected in middle portions and respectively have upper ends and lower ends, the upper end of the first connecting rod is rotatably connected with an upper end portion of one column assembly or the upper end of the second connecting rod of another cross-shaped support rod, the lower end of the first connecting rod is rotatably connected with the lower end of the second connecting rod of another cross-shaped support rod or the sliding block on another column assembly, the lower end of the second connecting rod is rotatably connected with the sliding block on the one column assembly or the lower end of the first connecting rod of another cross-shaped support rod, and the upper end of the second connecting rod is rotatably connected with the upper end of the first connecting rod of another cross-shaped support rod or an upper end portion of the another column assembly.

10. The foldable tent according to claim 1, wherein each of the top rod assemblies comprises a support rod, and the support rod is rotatably disposed between the inner end portion and the outer end portion of the first top rod, the support rods of the respective top rod assemblies are rotatably connected, and a joint of the respective support rods are located below a joint of the inner end portions of the respective first top rods.

11. The foldable tent according to claim 1, wherein the outer end portion of the second top rod and the inner end portion of the overhanging rod are both rotatably connected to the upper end portion of a corresponding column assembly via two axles.

12. The foldable tent according to claim 1, wherein the outer end portion of the second top rod and the inner end portion of the overhanging rod are both rotatably connected to the upper end portion of a corresponding column assembly coaxially.

* * * * *